(12) United States Patent
Martins et al.

(10) Patent No.: US 6,415,489 B1
(45) Date of Patent: Jul. 9, 2002

(54) HYDRAULICALLY ACTUATED TOOL FOR MOUNTING AND DISMOUNTING ROLLING MILL ROLL NECK BEARINGS

(75) Inventors: Armando S. Martins, Cumberland, RI (US); Peter N. Osgood, Upton, MA (US)

(73) Assignee: Morgan Construction Company, Worcester, MA (US)

( * ) Notice: Subject to any disclaimer, the term of this patent is extended or adjusted under 35 U.S.C. 154(b) by 0 days.

(21) Appl. No.: 09/605,601

(22) Filed: Jun. 28, 2000

Related U.S. Application Data
(60) Provisional application No. 60/146,280, filed on Jul. 29, 1999.

(51) Int. Cl.[7] .................................................. B23P 19/04
(52) U.S. Cl. ............................................................ 29/252
(58) Field of Search ................................ 29/895, 895.1, 29/252, 263, 282

(56) References Cited

U.S. PATENT DOCUMENTS

| | | |
|---|---|---|
| 3,627,388 A | 12/1971 | Jennings et al. |
| 4,286,830 A | 9/1981 | Salter, Jr. |
| 4,352,229 A | 10/1982 | Moore, Jr. |
| 4,733,458 A | 3/1988 | Benfer et al. |
| 4,813,113 A | 3/1989 | Wykes et al. |
| 5,800,088 A | 9/1998 | Luckhof et al. |

OTHER PUBLICATIONS

Japanese Patent Abstract No. JP8024917.

Primary Examiner—Robert C. Watson
(74) Attorney, Agent, or Firm—Samuels, Gauthier & Stevens

(57) ABSTRACT

A tool is disclosed for axially urging a bearing assembly into and out of a seated position on the neck of a roll in a rolling mill. The tool includes a piston surrounded by a cylinder. The piston is removably fixed to the roll neck and is configured to internally subdivide the cylinder into first and second chambers. Fluid conduits are arranged to alternatively pressurize the first and second chambers to alternatively shift the cylinder with respect to the thus fixed piston in opposite first and second directions. Movement of the cylinder in the first direction urges the bearing assembly into its seated position, and movement of the cylinder in the opposite second direction dislodges the bearing assembly from its seated position.

9 Claims, 21 Drawing Sheets

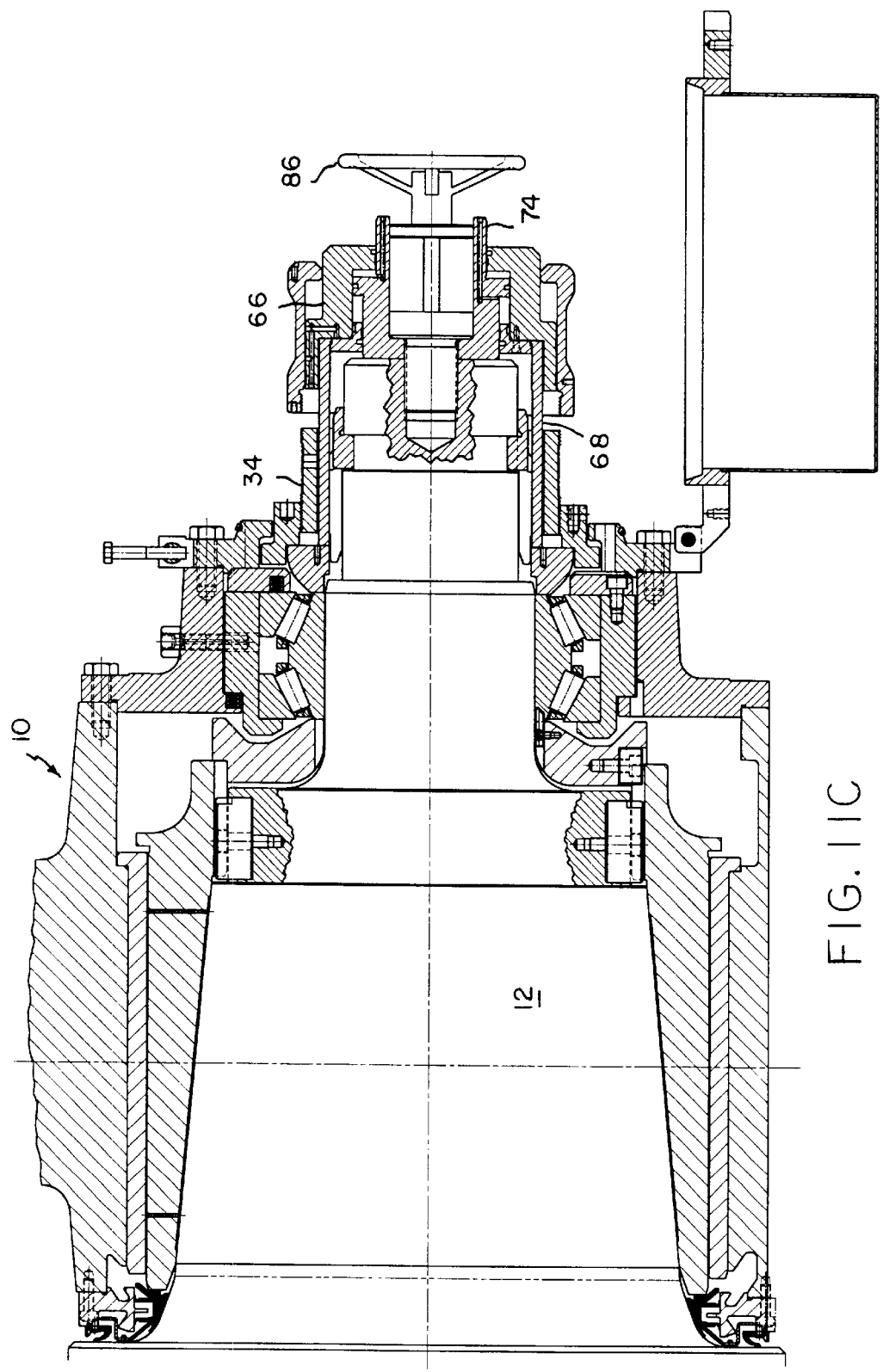

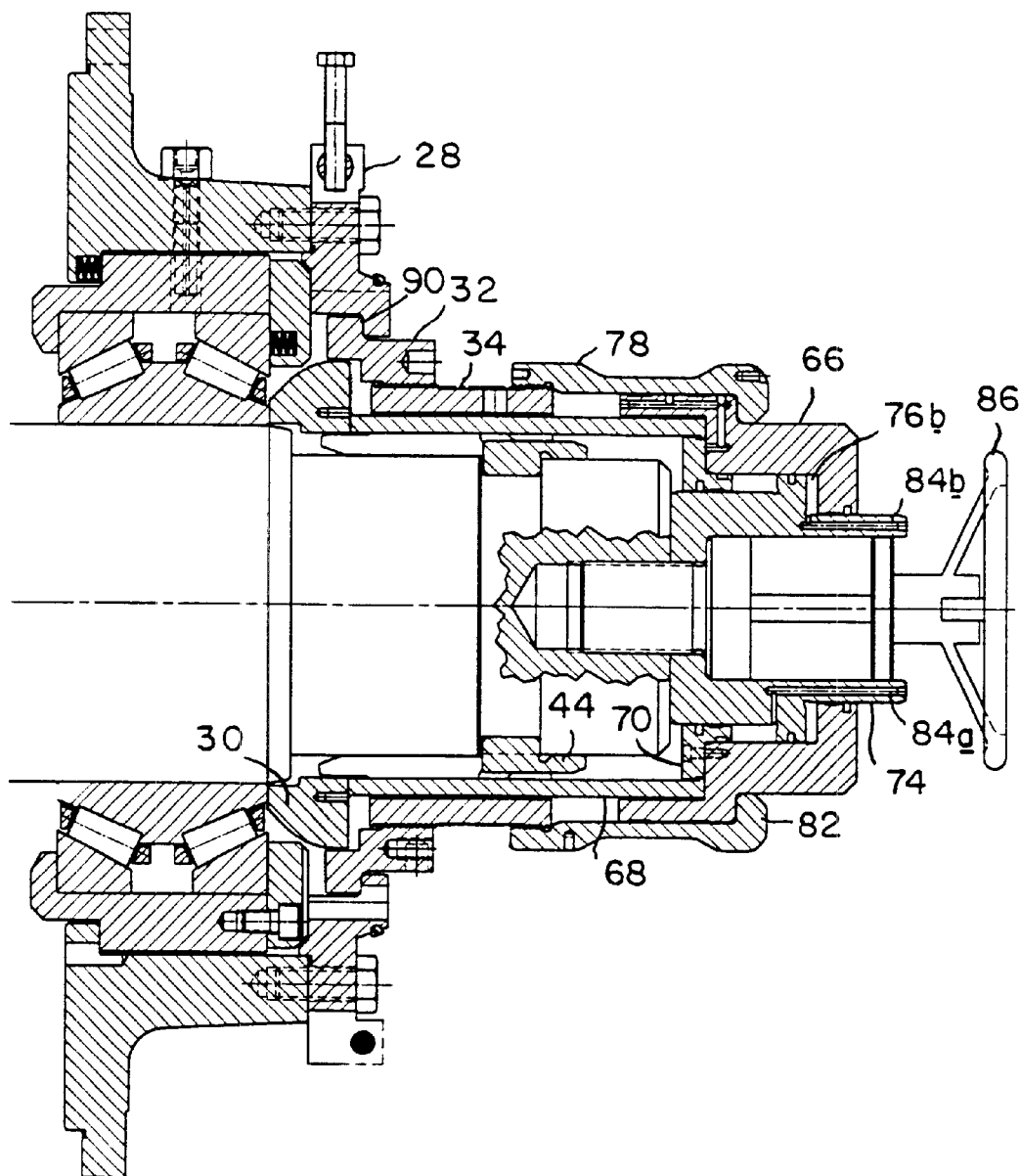
FIG. IIF

HYDRAULICALLY ACTUATED TOOL FOR MOUNTING AND DISMOUNTING ROLLING MILL ROLL NECK BEARINGS

RELATED APPLICATIONS

This application claims priority from provisional application Serial No. 60/146,280 filed Jul. 29, 1999.

BACKGROUND OF THE INVENTION

1. Field of the Invention

This invention relates in general to bearing assemblies for rotatably supporting the necks of rolls in a rolling mill, and is concerned in particular with a portable hydraulically actuated tool which may be detachably connected to the bearing assemblies for use in axially urging the bearing assemblies into and out of seated positions on the roll necks.

2. Description of the Prior Art

It is known to employ either screw actuated or hydraulically actuated devices for axially urging rolling mill bearing assemblies into and out of their seated positions on the roll necks. Typically, such devices are incorporated as integral components of the bearing assemblies, thereby adding considerably to the cost of the bearing assemblies. An additional drawback with the screw actuated devices is that they are difficult to tighten, often requiring the use of cables tensioned by overhead cranes. This is an inexact procedure, with attendant risk of injury to maintenance personnel and damage to equipment.

It is also known to employ portable hydraulically actuated tools which may be detachably connected to the bearing assemblies. However, such tools are designed to only urge the bearing assemblies into their seated positions, and are not useful in the reverse mode to dismount the bearing assemblies. Thus, dismounting must be effected by other means, again including the use of overhead cranes and/or other hydraulically or mechanically actuated devices.

The objective of the present invention is to provide a portable hydraulically actuated tool which is adapted for detachable connection to the bearing assembly, and which is operable in both a mounting mode to urge the bearing assembly into a seated position on the roll neck, as well as in a dismounting mode to dislodge the bearing assembly from its seated position.

This makes possible a significant reduction in bearing costs due to the fact that the tool of the present invention is separable from and can be employed to mount and dismount multiple bearing assemblies. Mounting and dismounting procedures can be carried out safely, without having to resort to the use of overhead cranes and the like to urge the bearing assemblies into and out of their seated positions on the roll necks.

These and other objectives and advantages will now be described in greater detail with reference to the accompanying illustrations, wherein:

BRIEF DESCRIPTION OF THE DRAWINGS

FIGS. 11A–11H are illustrations showing how the fluid actuated tool of the present invention is employed in dismounting a bearing assembly from a roll neck.

DETAILED DESCRIPTION OF PREFERRED EMBODIMENT

Figure 1:
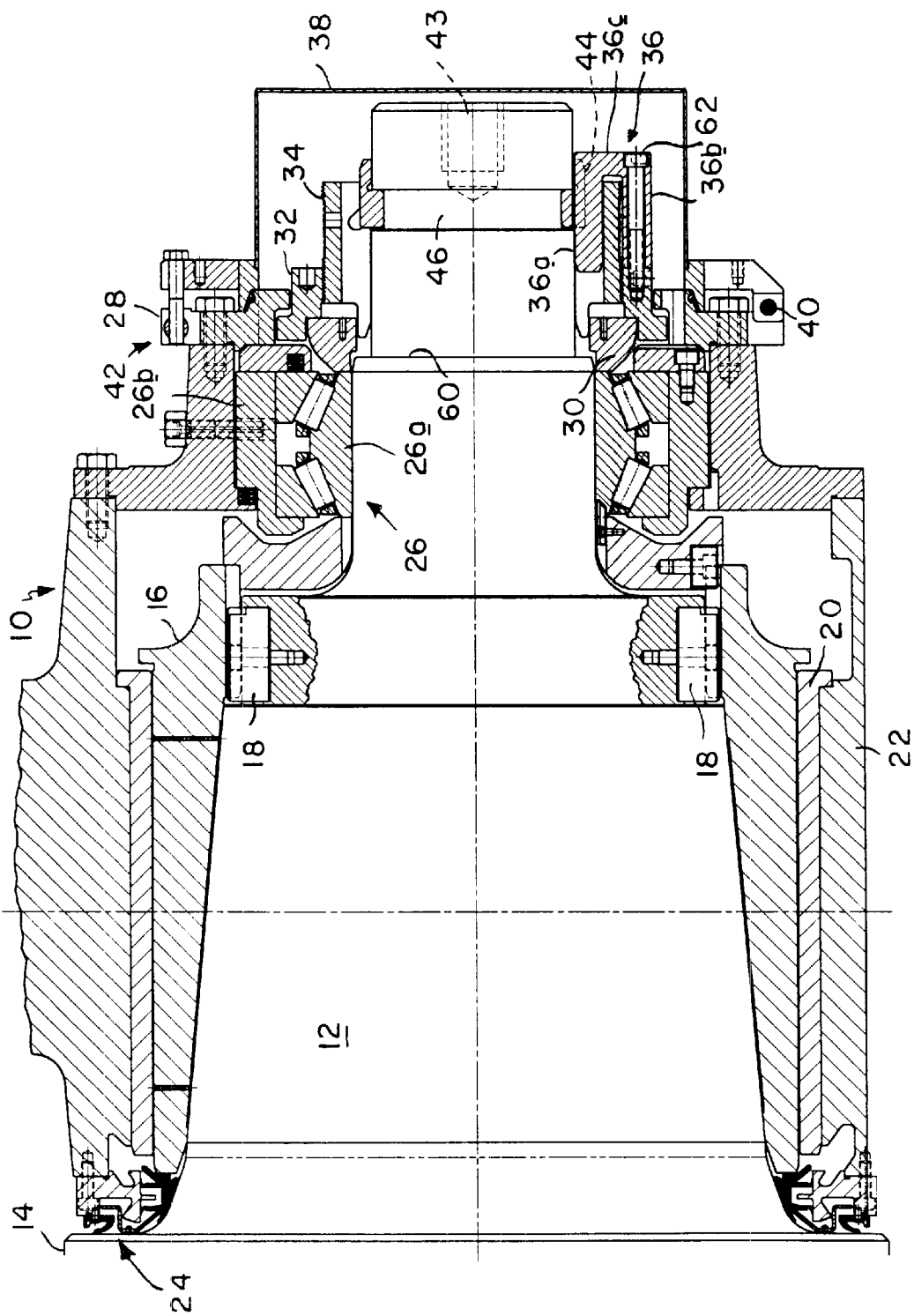
FIG. 1 is a longitudinal sectional view of an oil film bearing assembly of the type with which the hydraulically actuated tool of the present invention may be employed.

With reference initially to FIG. 1, an oil film bearing assembly generally indicated at 10 is shown mounted on the tapered neck section 12 of a roll 14 of the type found in rolling mills. The bearing assembly includes a sleeve 16 keyed to the roll neck as at 18. The sleeve is surrounded by a bushing 20 contained within a chock 22. The chock is adapted to be supported in a roll housing (not shown). During mill operation, oil is introduced continuously between the sleeve 16 and bushing 20, resulting in the sleeve being rotatably supported on a hydrodynamically maintained film of oil at the bearing load zone.

On its inboard side, the bearing assembly further includes a seal assembly 24. As can be seen by further reference to FIG. 2, the outboard side of the bearing assembly includes a thrust bearing 26 having an inner race 26a and outer races contained by a thrust bearing retainer 26b, an end plate 28, a circular transfer plate 30, a lock nut 32 threaded onto a threaded ring 34, a locking element 36 mechanically coupling the threaded ring 34 to the lock nut 32, and an end cover 38 pivotally connected at 40 to the end plate 28, and held in a closed position by a latching mechanism 42. The distal end of the roll neck is provided with a threaded locking screw hole 43.

Figure 3:
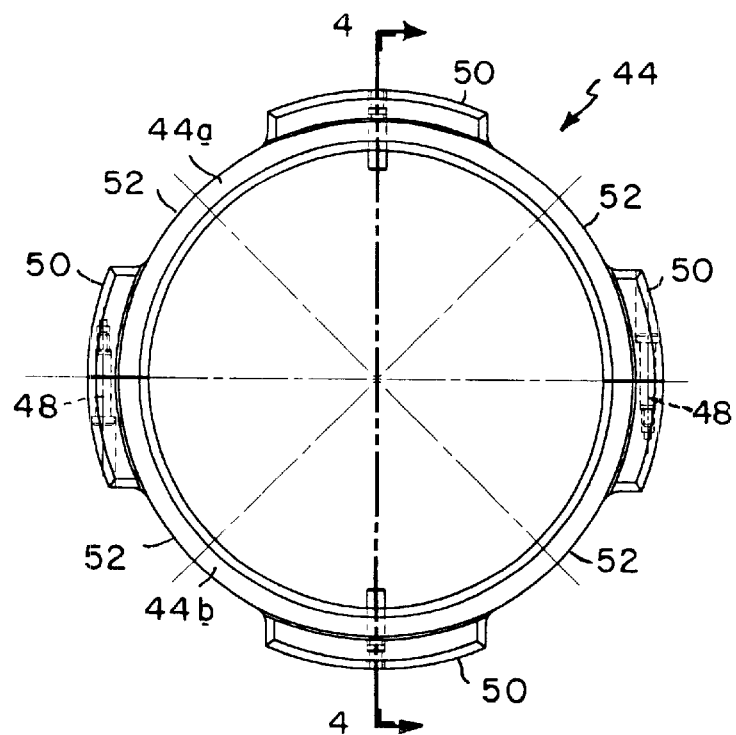
FIG. 3 is an end view of the split bayonet adaptor shown in FIGS. 1 and 2.
Figure 4:
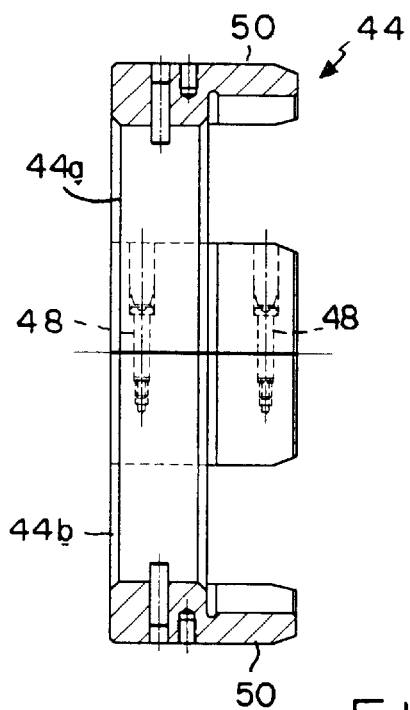
FIG. 4 is a cross sectional view taken along line 4—4 of FIG. 3.

A split bayonet adaptor 44 is seated in a circular groove 46 in a reduced diameter end section of the roll neck. As can best be seen in FIGS. 3 and 4, the split bayonet adaptor 44 is subdivided into two semicircular halves 44a, 44b joined together by screws 48. The adaptor is provided with radially outwardly protruding lugs 50 circumferentially spaced by flutes 52.

Figure 2:
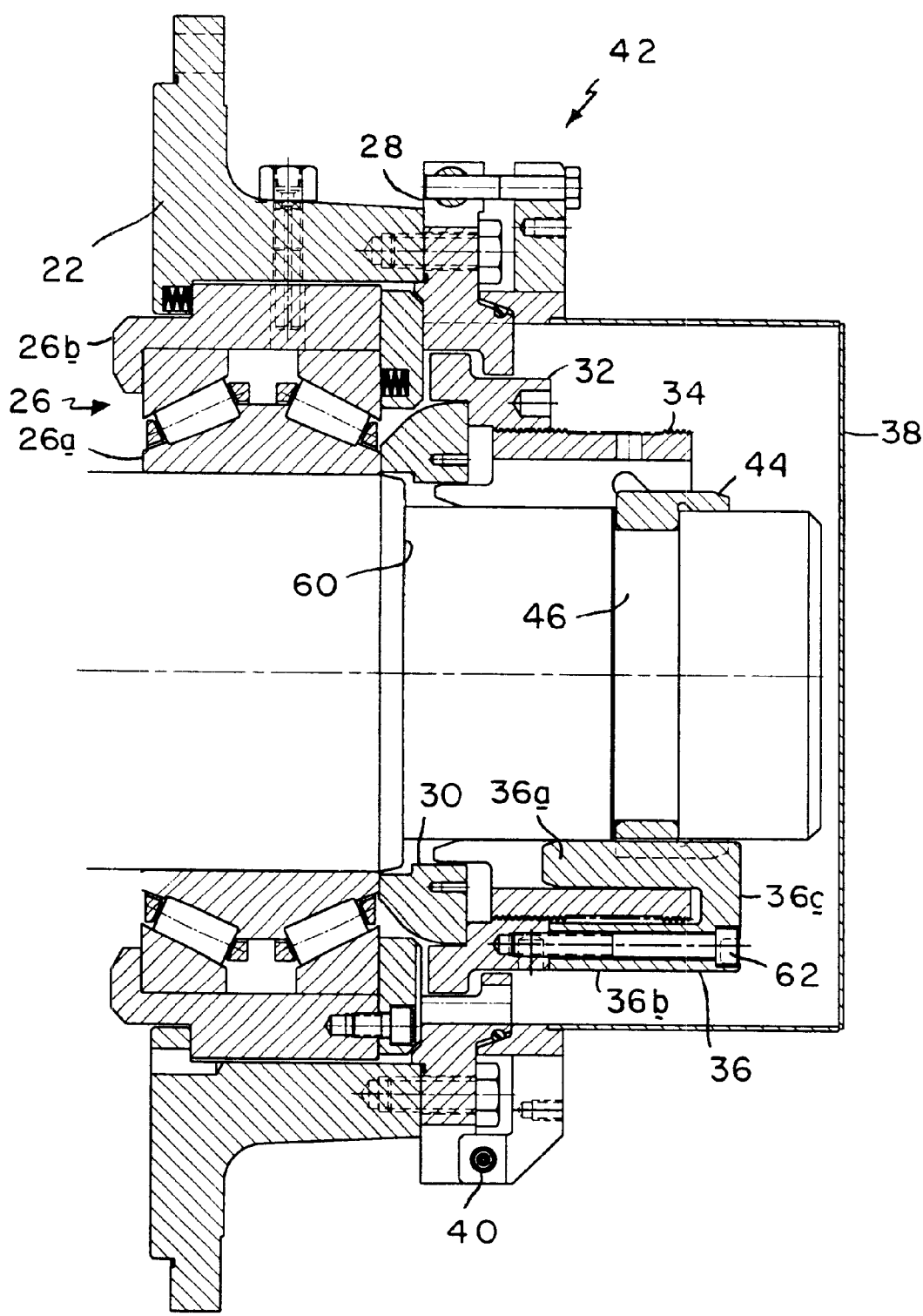
FIG. 2 is an enlarged view of the outboard end of the bearing assembly shown in FIG. 1.
Figure 6:
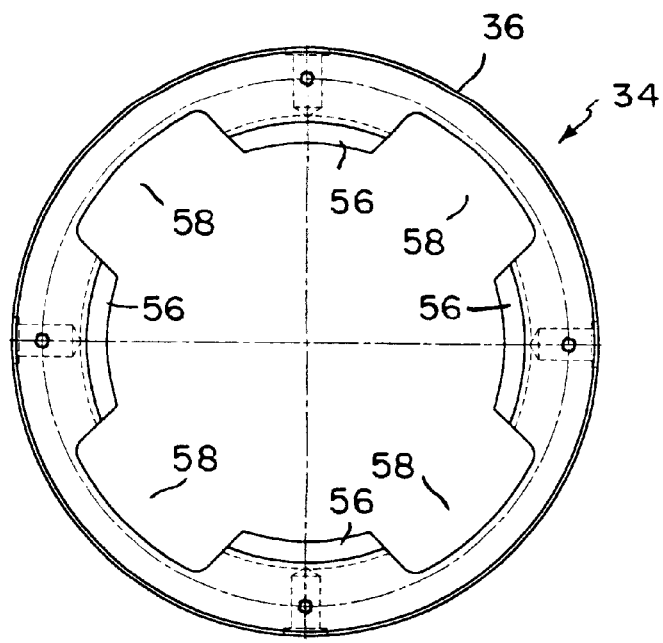
FIG. 6 is an end view of the threaded ring shown in FIG. 5.
Figure 5:
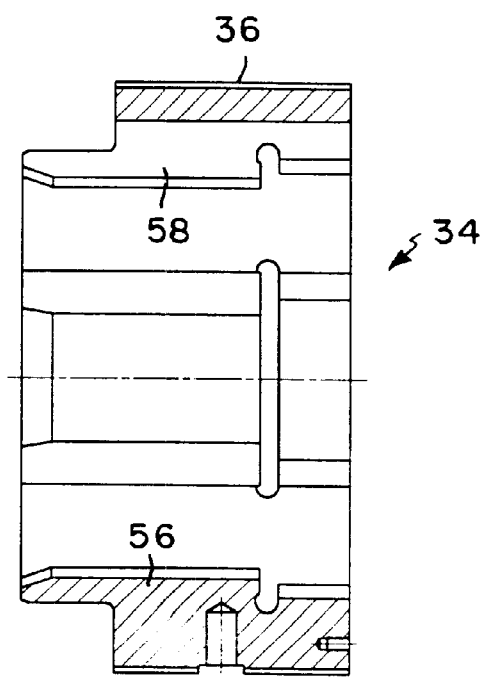
FIG. 5 is a longitudinal sectional view taken through the threaded ring shown in FIGS. 1 and 2.

As shown in FIGS. 5 and 6, the threaded ring 34 is externally threaded at 36, and is provided internally with inwardly protruding lugs 56 circumferentially spaced by flutes 58. When the threaded ring is positioned as shown in FIGS. 1 and 2, its lugs 56 are aligned axially with the lugs 50 of the split bayonet adaptor. The threaded ring is thus axially captured between the adaptor lugs 50 and a shoulder 60 on the roll neck.

The lock nut 32 is threaded onto the ring 34, and in its tightened condition as shown in FIGS. 1 and 2, bears against the transfer plate 30, the latter in turn being held against the inner race 26a of the thrust bearing 26.

Figure 7A:
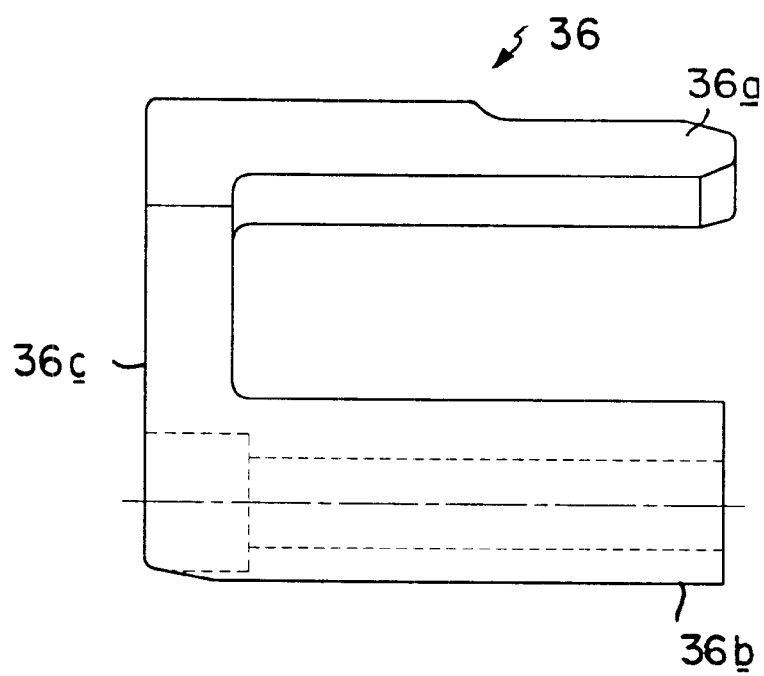
FIGS. 7A and 7B are respective side and end views of the locking element shown in FIGS. 1 and 2.
Figure 7B:
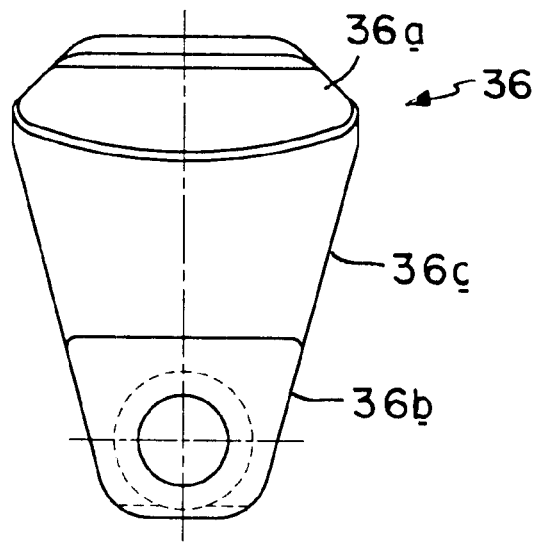

As shown in FIGS. 7A and 7B, the locking element 36 includes upper and lower parallel legs 36a, 36b joined by a web 36c. The upper leg 36a is configured to extend through a flute 58 between two lugs 56 of the threaded ring 34, and the lower leg 36b is secured to the lock nut 32 by one or more screws 62. When thus positioned, the locking element prevents relative rotation between the lock nut 32 and the threaded ring 34.

Figure 8:
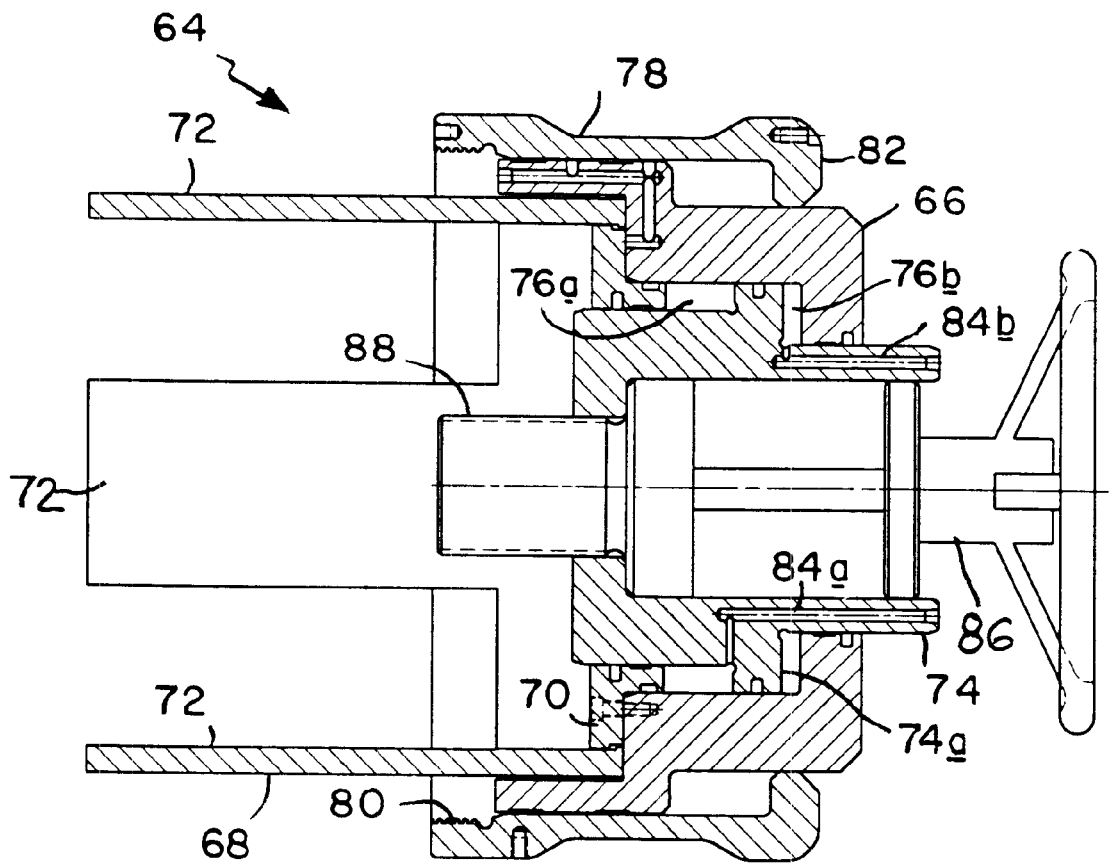
FIG. 8 is a longitudinal sectional view taken through a preferred embodiment of a fluid actuated portable tool in accordance with the present invention.
Figure 9:
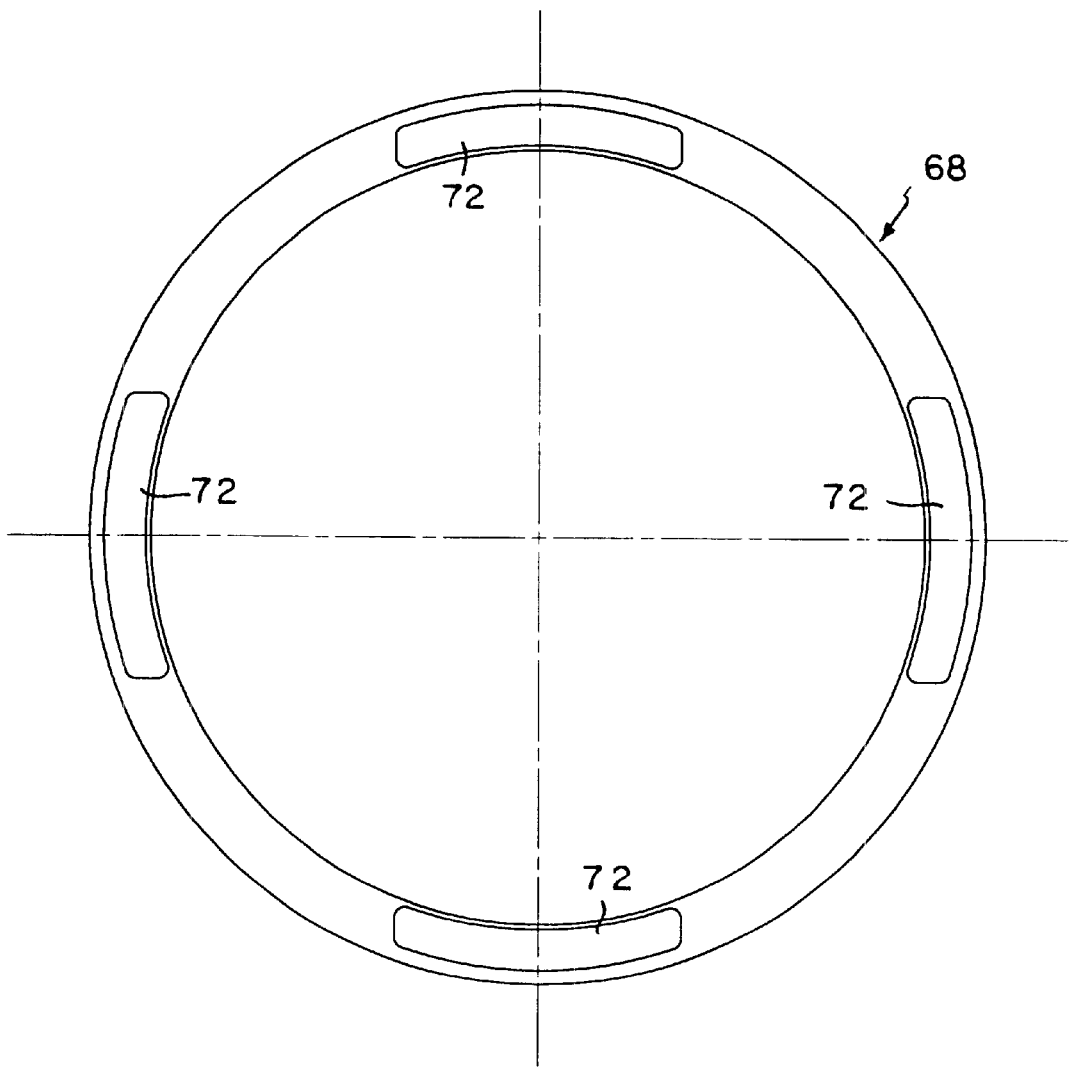
FIG. 9 is an enlarged end view of the tool showing the circumferential spacing of the fingers extending axially from the cylinder.

With reference to FIGS. 8 and 9, a preferred embodiment of a portable hydraulically actuated tool according to the present invention is illustrated at 64. The tool includes a cylinder 66 having a fork ring 68 fixed thereto by a cylinder cap 70. The fork ring has circumferentially spaced fingers 72 which project axially from the cylinder 66.

The cylinder 66 surrounds a hollow piston 74. The piston has a circular external flange 74a which internally subdivides the cylinder into first and second chambers 76a, 76b. A locking ring 78 is mounted on and shiftable axially with respect to the cylinder 66. The locking ring is internally threaded at one end as at 80, and is provided with a circular inwardly projecting shoulder 82 at its opposite end. As an alternative to the threads 80, bayonet type lugs could be provided to mechanically coact with mating lugs on the ring 34. The piston 74 is provided with first and second fluid passageways 84a, 84b communicating respectively with the first and second chambers 76a, 76b. A locking screw 86 extends through the piston 74 and is externally threaded as at 88.

Mounting Sequence

Figure 10A:
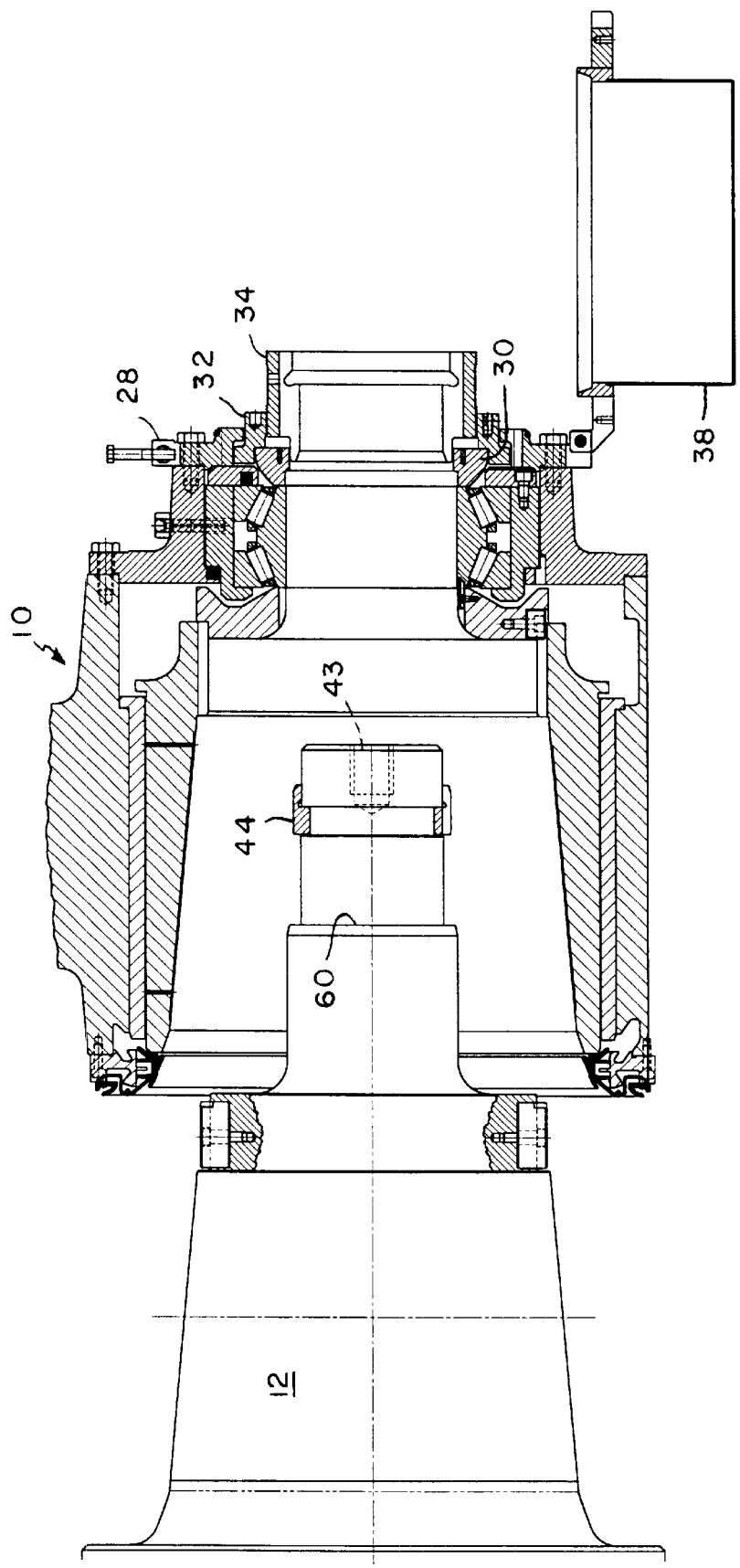
FIGS. 10A–10F are illustrations showing how the fluid actuated tool of the present invention is employed in mounting a bearing assembly on a roll neck.

In FIG. 10A, the bearing assembly 10 is shown removed from the tapered section 12 of the roll neck. The split bayonet adaptor 44 is in place on the roll neck. The split bayonet adaptor 44 is used with rolls which do not have the lugs 50 and flutes 52 machined into their necks. When the roll necks are integrally provided with these features, the bayonet adaptor is not required. The threaded ring 34 is rotatably adjusted with respect to the split bayonet adaptor 44 to axially align the lugs of one component with the flutes of the other component, i.e., adaptor lugs 50 are aligned with threaded ring flutes 58, and adaptor flutes 52 are aligned with threaded ring lugs 56. With the end cover 38 in its open position, the bearing assembly is then axially mounted on the roll neck.

Figure 10B:
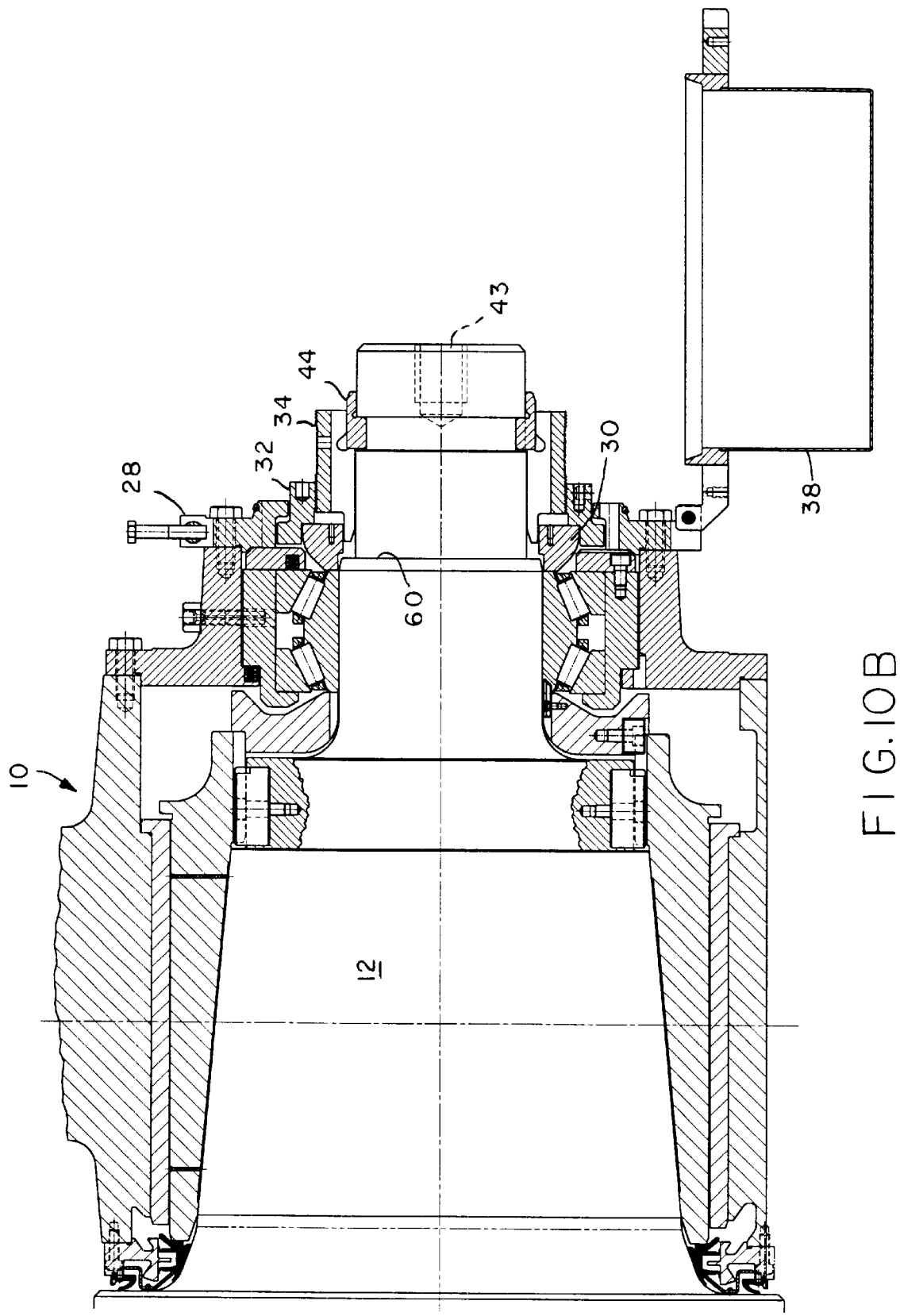

After the bearing assembly is positioned as shown in FIG. 10B, the threaded ring 34 is rotated 45° to axially align its lugs 56 with the bayonet adaptor lugs 50, thereby axially fixing the threaded ring in place between the shaft shoulder 60 and the bayonet adaptor lugs 50. The lock nut 32 is then tightened to remove any axial play from the system.

Figure 10C:
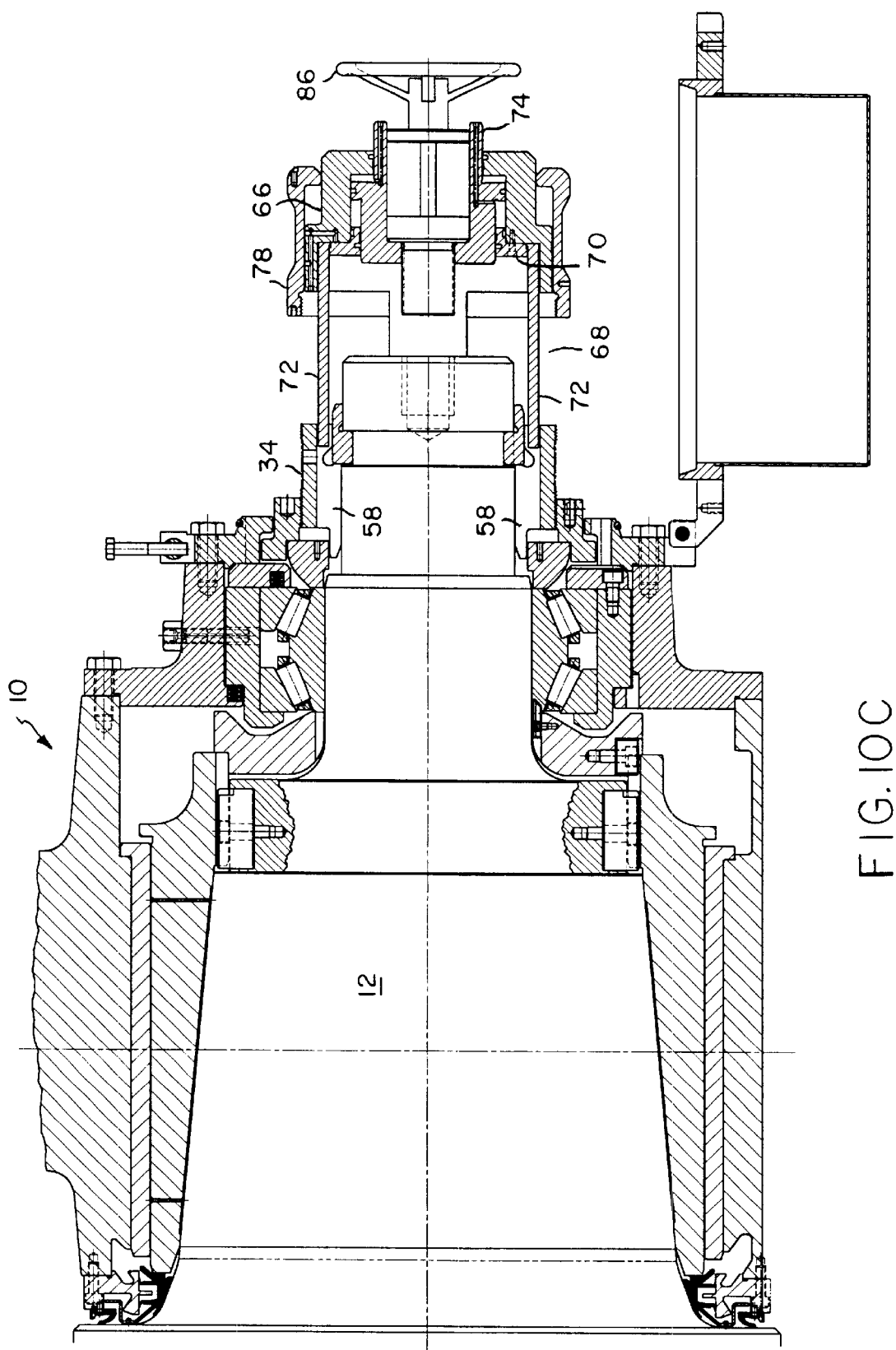

As shown in FIG. 10C, the tool 64 is then readied for connection to the bearing assembly 10. The fingers 72 of the fork ring 68 are aligned with the flutes 58 of the threaded ring 34.

Figure 10D:
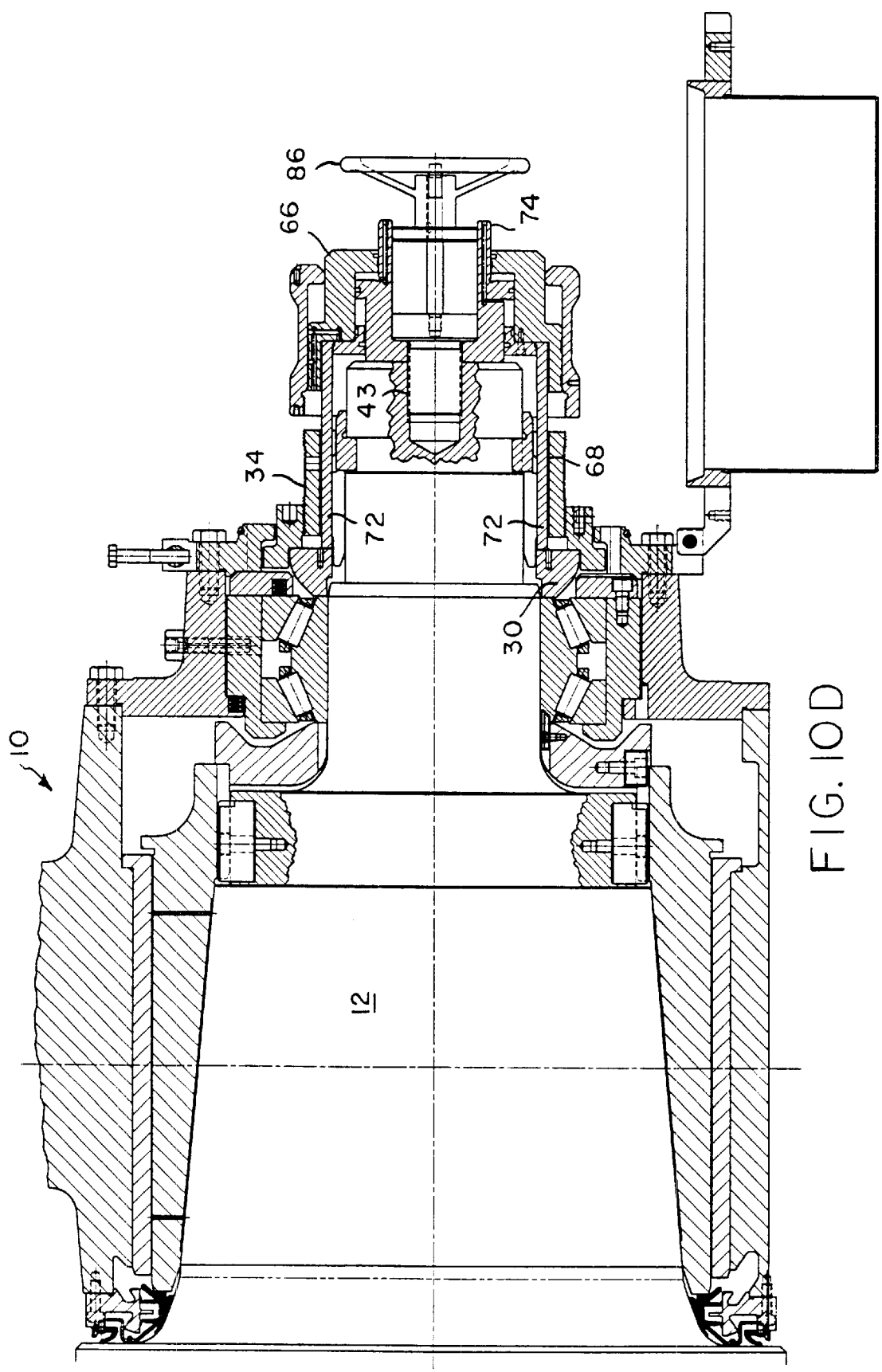

As shown in FIG. 10D, the tool is then axially inserted into its operative position (from right to left), thereby extending the fingers 72 through the threaded ring flutes 58 to abut against the transfer plate 30. The locking screw 86 is threaded into the locking screw hole 43 to thereby fix the piston 74 against the end of the roll neck.

Figure 10E:
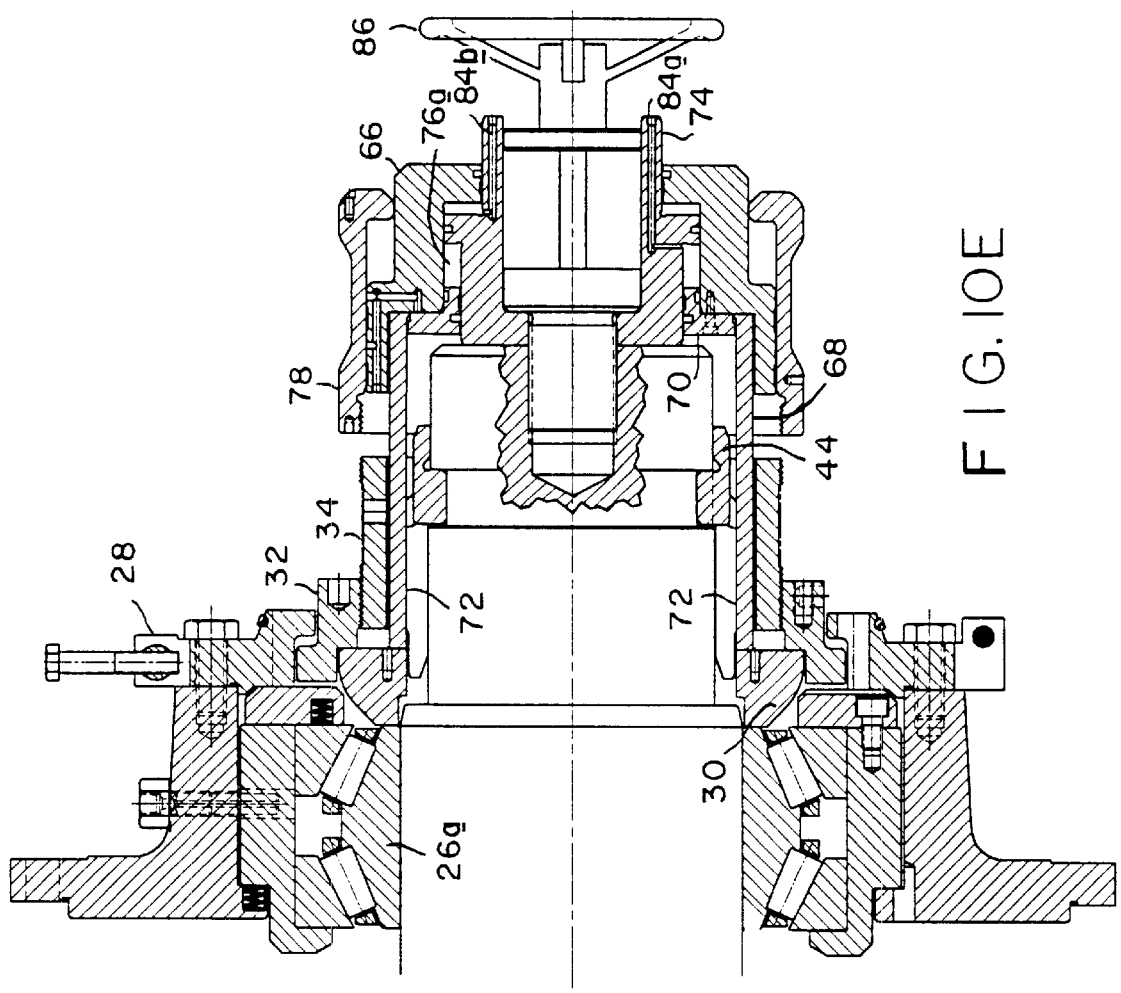

As shown in FIG. 10E, hydraulic fluid is then admitted via passageway 84a to the first chamber 76a. Because the piston 74 is fixed with respect to the roll neck, the cylinder cap 70 and fork ring 68 are urged to the left, causing the fingers 72 to bear against the transfer plate 30, which in turn bears against the inner thrust bearing race 26a. The cylinder cap 70, fork ring 68, fingers 72, transfer plate 30 and inner dust bearing race 26a thus art in concert as a first force exerting means to urge the bearing assembly in a first direction (to the left as viewed in the illustration) into its seated position on the tapered section 12 of the roll neck. The lock nut 32 is then tightened to mechanically hold the bearing assembly in its seated position.

Figure 10F:
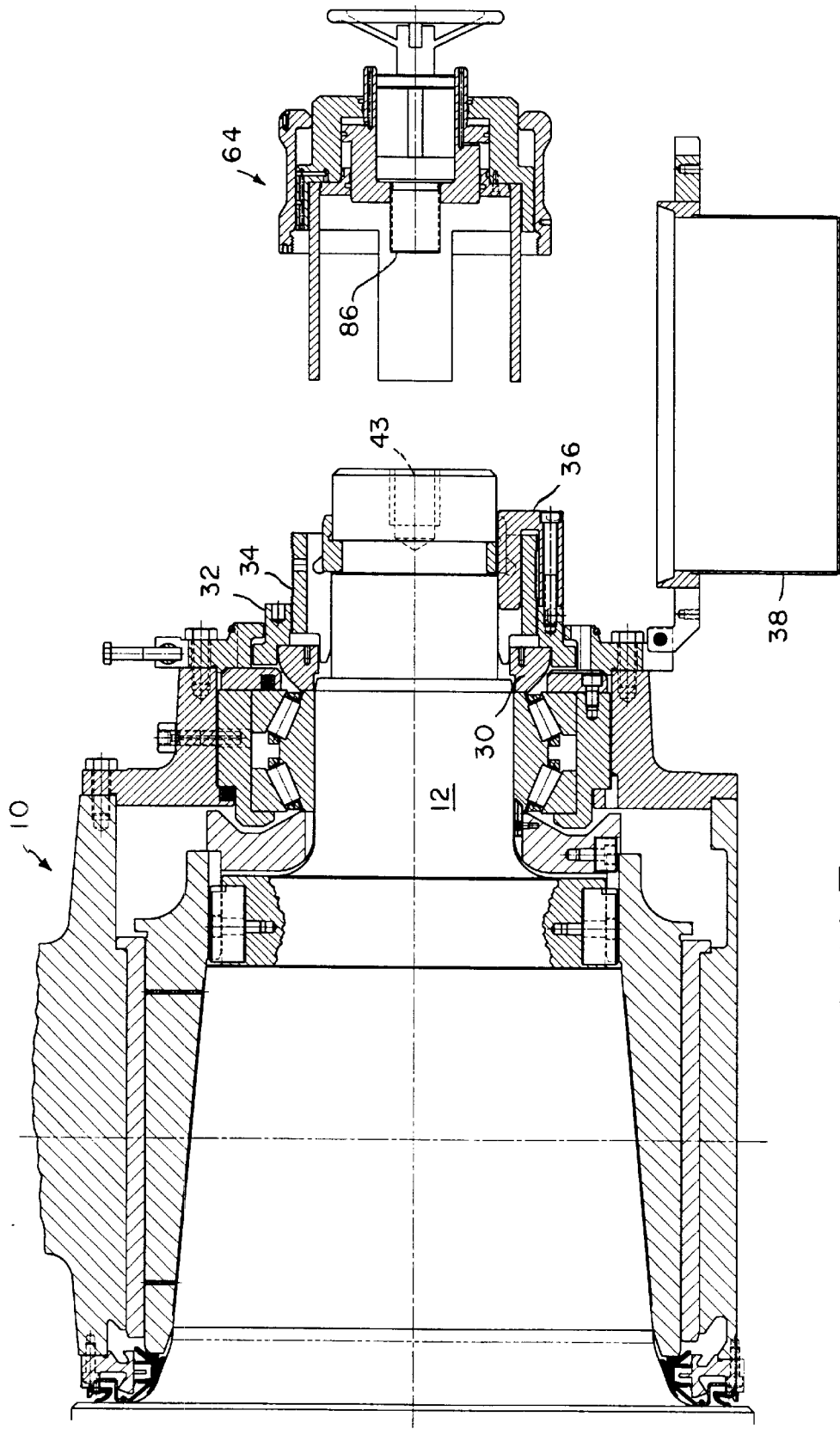

Finally, as shown in FIG. 10F, the hydraulic pressure is relieved, the locking screw 86 is disengaged from the locking screw hole 43 in the end of the roll neck, and the tool 64 is removed from the bearing assembly. The locking element 36 is then inserted into its operative position to thereby prevent loosening of the lock nut 32. The end cover 38 is then closed and latched in place, and the bearing assembly is in its seated and operative position as shown in FIG. 1.

Dismounting Sequence

Figure 11A:
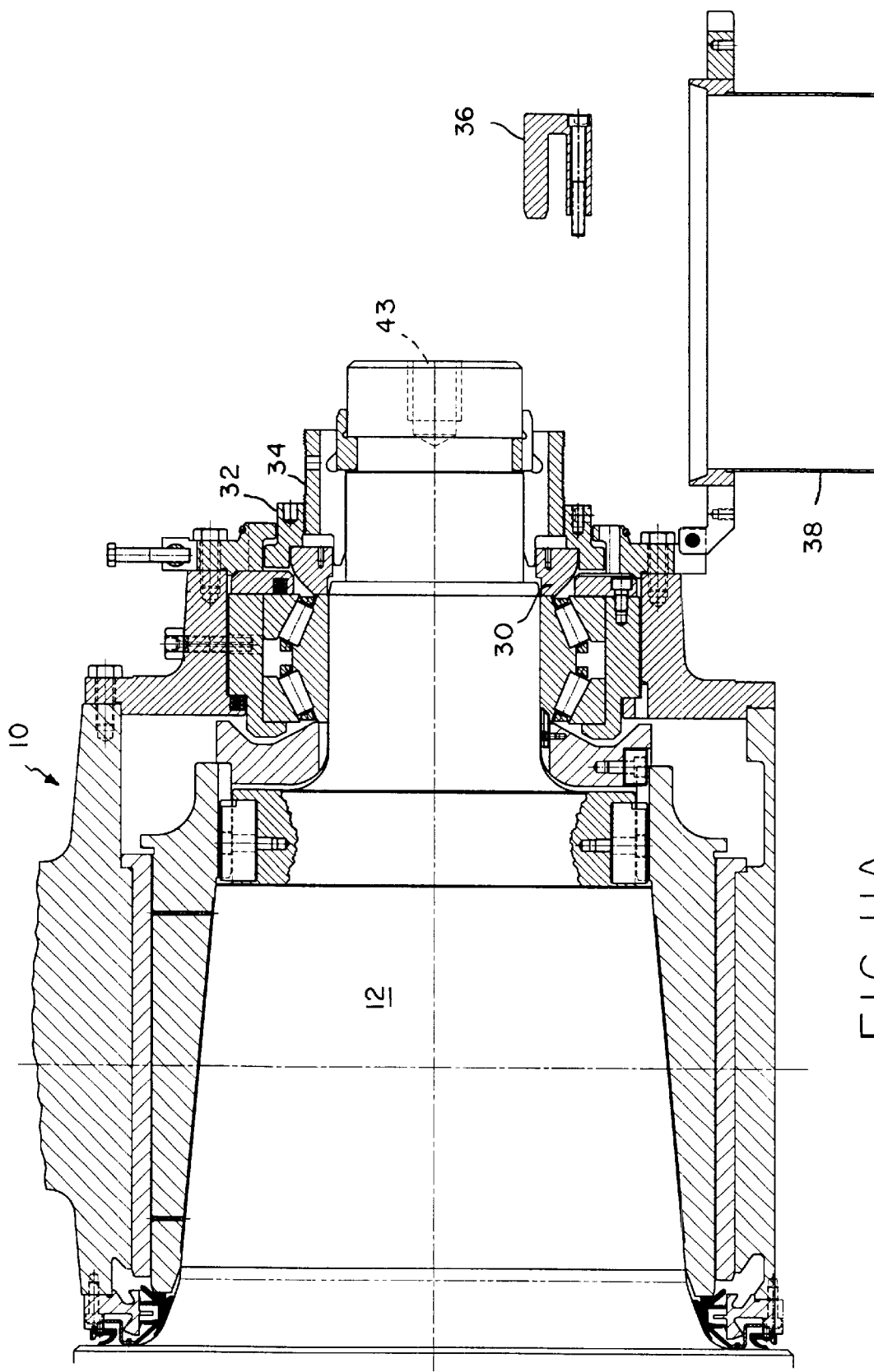

The first step in the dismounting sequence is shown in FIG. 11A. The end cover 38 is opened, and the locking element 36 is disengaged from the lock nut 32 and threaded ring 34.

Figure 11B:
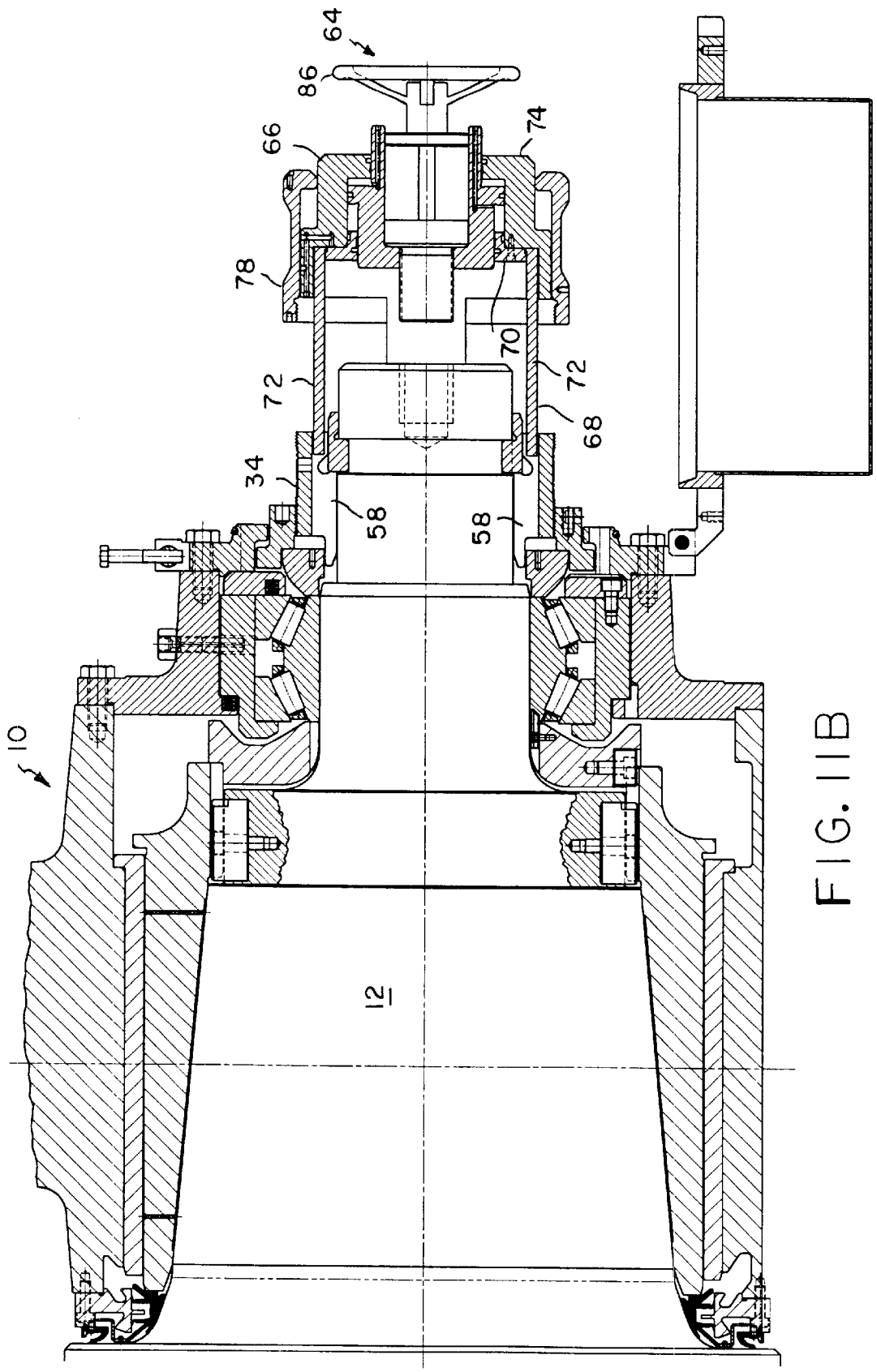

As shown in FIG. 11B, the tool 64 is again readied for insertion into the bearing assembly, with the fingers 72 of the fork ring 68 aligned with the flutes 58 of the threaded ring 34.

FIG. 11C shows the tool in place, with the piston 74 again secured by the locking screw 86 to the end of the roll neck.

Figure 11D:
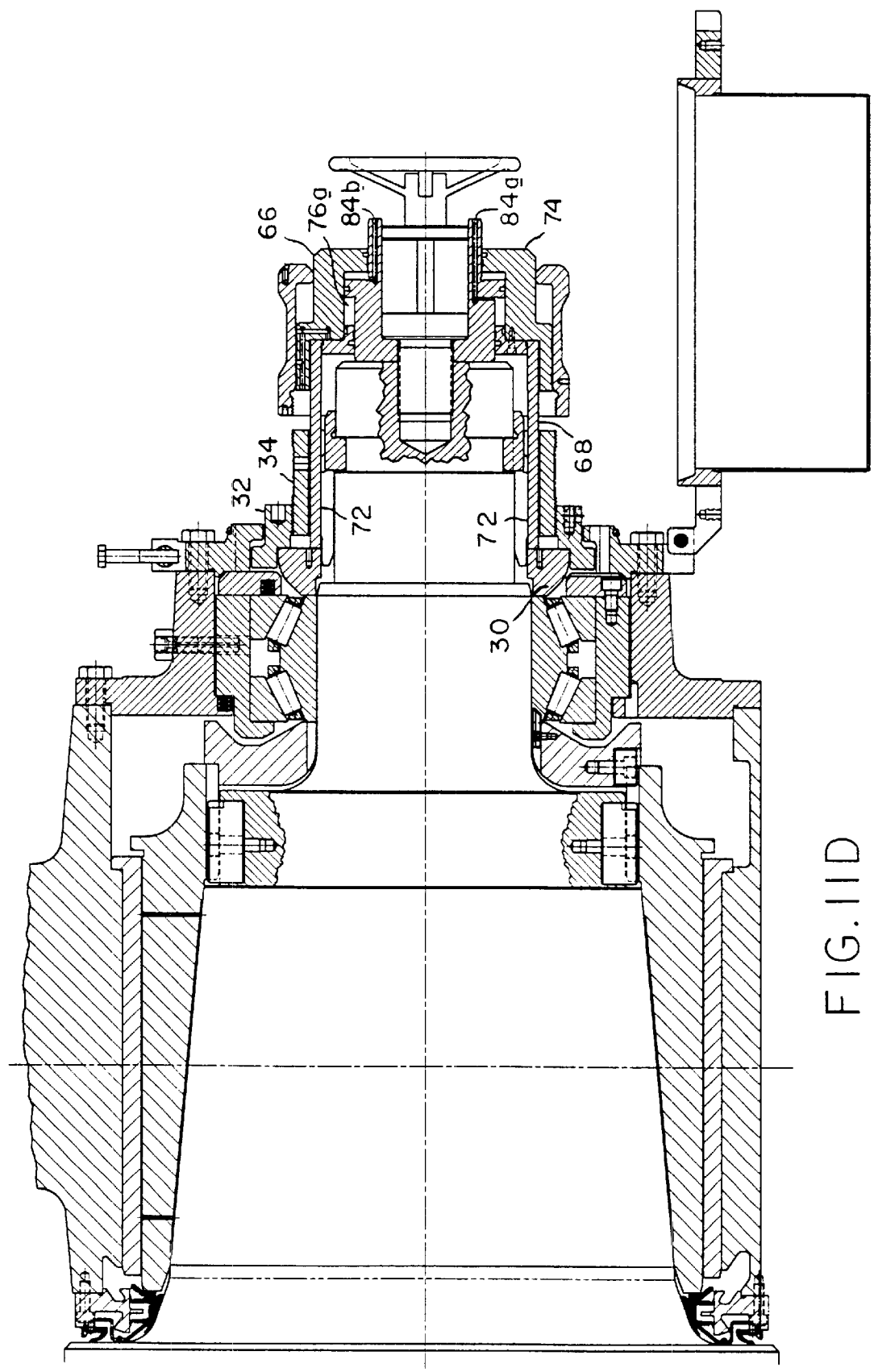

In FIG. 11D, hydraulic fluid is admitted via passageway 84a to the first chamber 76a to urge the fingers 72 of the fork ring 68 against the transfer plate 30, thereby relieving the stresses on the lock nut 32. The lock nut is then loosened slightly, and the hydraulic pressure in the first chamber 76a is relieved.

Figure 11E:
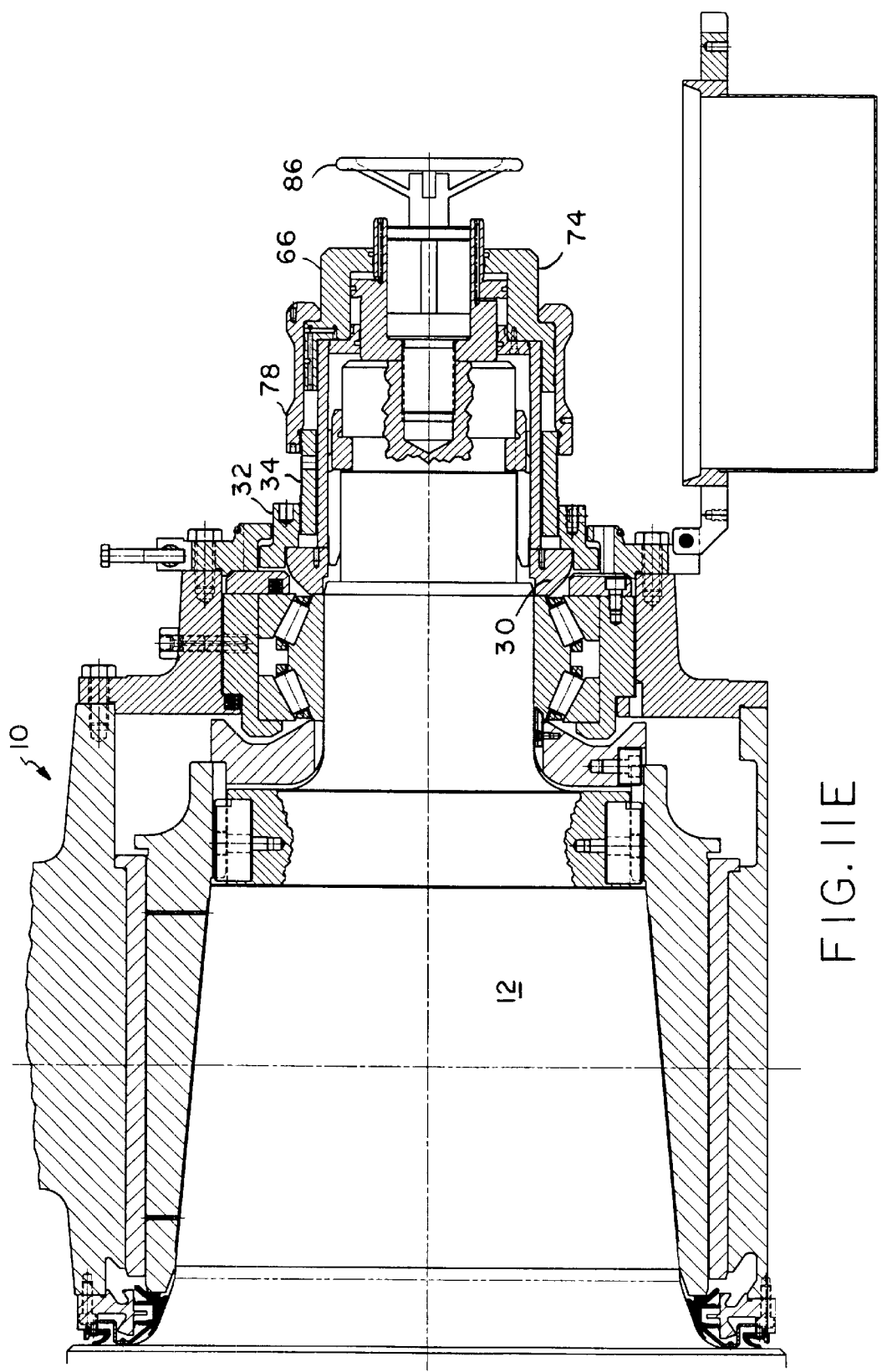

In FIG. 11E, the threaded ring 34 is rotated 45° to its unlocked position (lugs 50 aligned with flutes 58, and flutes 52 aligned with lugs 56). The locking ring 78 is then axially advanced with respect to the cylinder 66 and threaded onto the threaded ring 34.

In FIG. 11F, the second chamber 76b is pressurized by hydraulic fluid admitted via passageway 84b. The cylinder 66 is thus shifted in an opposite second direction with respect to the fixed piston 74 (to the right as viewed in the illustration). The cylinder 66 engages the shoulder 82 of the locking 78, causing the locking ring, the threaded ring 34 and the lock nut 32 to move in the same direction. The lock nut 32 engages the end plate 28 as at 90, with the locking ring 78, threaded ring 34, lock nut 32 and end plate 28 acting in concert as a second force exerting means to pull the bearing assembly out of its seated position on the tapered section 12 of the roll neck.

Figure 11G:
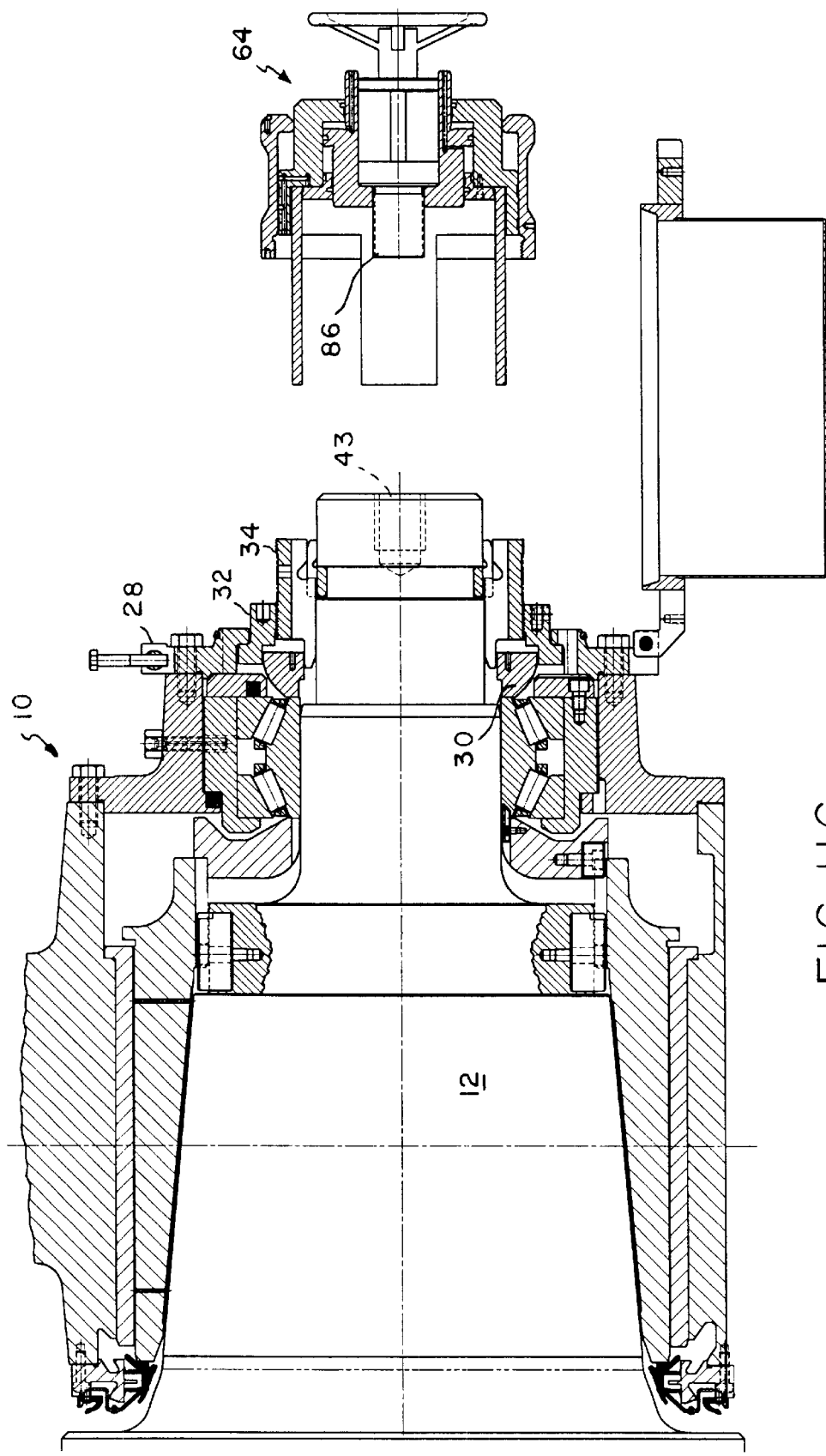
Figure 11H:
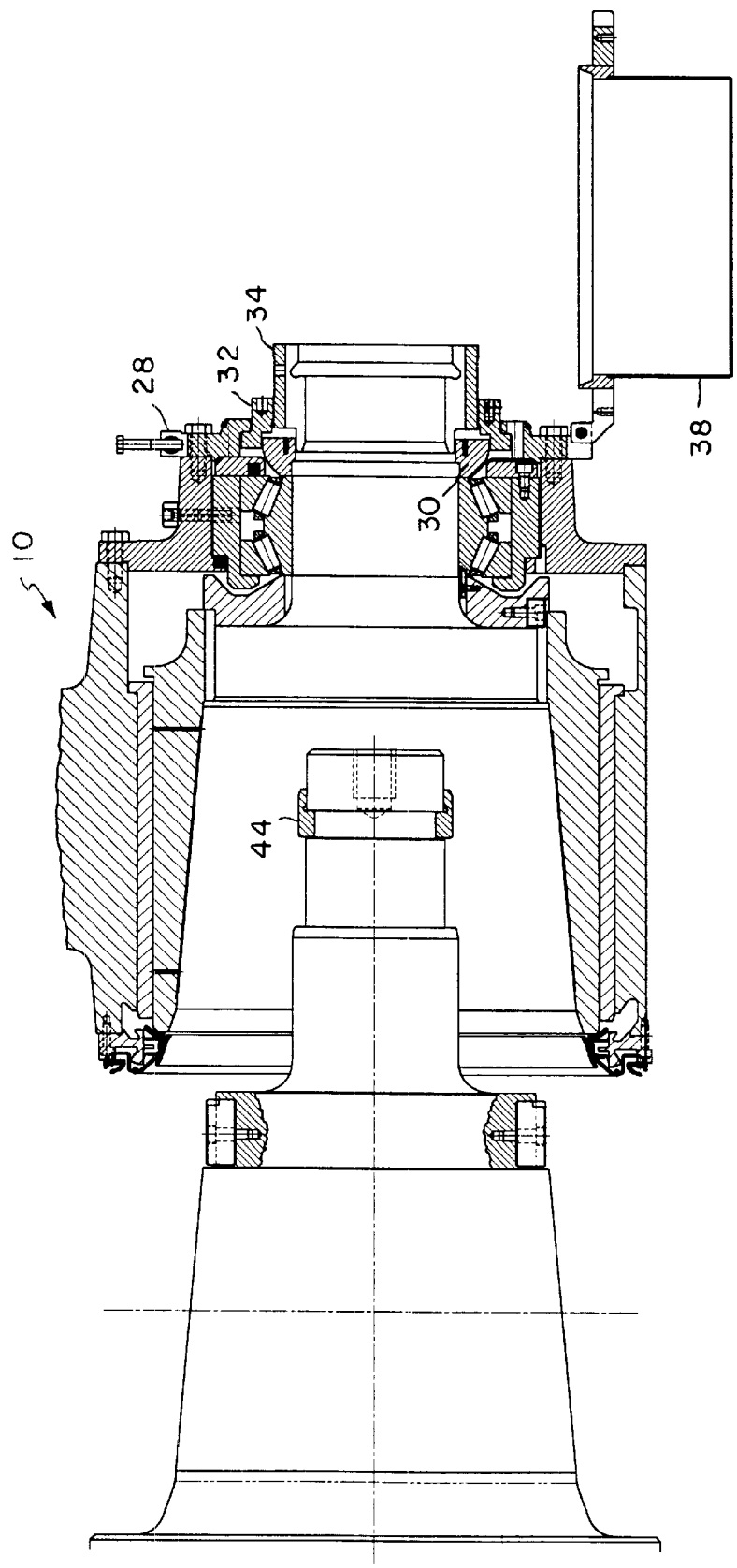

As shown in FIG. 11G, the locking screw 86 is disengaged from the roll neck, and the tool 64 is removed from the bearing assembly 12. Finally, as shown in FIG. 11H, the bearing assembly is removed from the roll neck.

In light of the foregoing, it thus will be seen that the hydraulically actuated tool 64 of the present invention is compactly designed as an integral unit which can be readily attached and removed from the roll neck and bearing assembly. The tool is operable in both a mounting and dismounting mode, requiring little adjustment to shift from one mode to the other. Both operating sequences are relatively simple and straightforward, leaving little opportunity for error, while safeguarding operating personnel from injury and equipment from damage.

We claim:

1. Apparatus for axially urging a bearing assembly into and out of a seated position on the neck of a roll in a rolling mill, said roll neck having an end which protrudes axially from the bearing assembly when the bearing assembly is in said seated position, said apparatus comprising:

a piston surrounded by a cylinder, said piston being configured to internally subdivide said cylinder into axially separated first and second chambers;

attachment means for removably fixing said piston to the end of said roll neck;

fluid means for alternatively pressurizing said first and second chambers to alternatively shift said cylinder with respect to the thus fixed piston in opposite first and second directions;

first force exerting means responsive to shifting of said cylinder in said first direction for engaging and axially urging said bearing assembly into said seated position; and second force exerting means responsive to shifting of said cylinder in said second direction for engaging and axially urging said bearing assembly out of said seated position.

2. Apparatus for axially urging a bearing assembly into and out of a seated position on the neck of a roll in a rolling mill, wherein the roll neck has an end which protrudes axially from the bearing assembly when the bearing assembly is in its seated position, and wherein the bearing assembly includes an externally threaded ring having circumferentially spaced radially inwardly protruding lugs coacting in a bayonet connection with circumferentially spaced radially outwardly protruding lugs fixed with respect to the roll neck, the threaded ring being rotatable on the roll neck between an engaged position at which said inwardly and outwardly protruding lugs are aligned circumferentially to axially retain the threaded ring on the roll neck, and a disengaged position at which said inwardly and outwardly protruding lugs are offset circumferentially to accommodate axial removal of the threaded ring from the roll neck, with a lock nut threaded onto the threaded ring, the lock nut being engageable with first and second axial thrust components of the bearing assembly said apparatus comprising:

a piston surrounded by a cylinder, said piston being configured to internally subdivide said cylinder into axially separated first and second chambers;

attachment means for removably fixing said piston to the end of the roll neck;

fluid means for alternatively pressurizing said first and second chambers to alternatively shift said cylinder with respect to the thus fixed piston in opposite first and second directions;

first force exerting means responsive to shifting of said cylinder in said first direction for acting via said first thrust component to axially urge the bearing assembly into its seated position; and second force exerting means responsive to shifting of said cylinder in said second direction for acting via said threaded ring, said locknut and said second thrust component to axially urge the bearing assembly out of its seated position.

3. The apparatus as claimed in claim 1 or 2 wherein said first force exerting means comprises a first ring extending axially from said cylinder.

4. The apparatus as claimed in claim 3 wherein said first ring includes circumferentially spaced tines configured to protrude axially through complimentary spaced slots in said threaded ring.

5. The apparatus as claimed in claim 3 wherein said first ring is carried by and fixed relative to said cylinder.

6. The apparatus as claimed in claim 1 or 2 wherein said second force exerting means comprises a second ring having one end threadedly engageable with said ring and having an opposite end axially engageable by said cylinder.

7. The apparatus as claimed in claim 6 wherein said second ring is carried by and axially shiftable with respect to said cylinder.

8. The apparatus as claimed in claim 1 or 2 wherein said piston, said cylinder and said first and second force exerting means are integrally combined into a unitary hydraulically actuated tool assembly.

9. The apparatus as claimed in claim 1 or 2 wherein said attachment means comprises a locking screw threaded into the end of said roll neck.

* * * * *